United States Patent
Han et al.

(10) Patent No.: US 11,475,068 B2
(45) Date of Patent: Oct. 18, 2022

(54) AUTOMATIC QUESTION ANSWERING METHOD AND APPARATUS, STORAGE MEDIUM AND SERVER

(71) Applicant: BOE Technology Group Co., Ltd., Beijing (CN)

(72) Inventors: Jianbo Han, Beijing (CN); Bingqian Wang, Beijing (CN)

(73) Assignee: BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 167 days.

(21) Appl. No.: 16/937,694

(22) Filed: Jul. 24, 2020

(65) Prior Publication Data

US 2021/0026899 A1 Jan. 28, 2021

(30) Foreign Application Priority Data

Jul. 26, 2019 (CN) .......................... 201910684222.2

(51) Int. Cl.
*G06F 16/9032* (2019.01)
*G10L 15/22* (2006.01)

(52) U.S. Cl.
CPC ........ *G06F 16/90332* (2019.01); *G10L 15/22* (2013.01); *G10L 2015/223* (2013.01)

(58) Field of Classification Search
CPC ............... G06F 16/90332; G10L 15/22; G10L 2015/223
See application file for complete search history.

(56) References Cited

U.S. PATENT DOCUMENTS

| | | | |
|---|---|---|---|
| 7,050,977 B1 * | 5/2006 | Bennett | G10L 15/30 704/E15.047 |
| 10,388,274 B1 * | 8/2019 | Hoffmeister | G06N 3/0445 |
| 10,592,540 B2 * | 3/2020 | Liu | G06F 16/3334 |
| 11,086,912 B2 * | 8/2021 | Gan | G06F 16/00 |

(Continued)

FOREIGN PATENT DOCUMENTS

| | | | | |
|---|---|---|---|---|
| CA | 2823835 A1 * | 2/2014 | ...... | G06F 16/90335 |
| CN | 103077165 A * | 5/2013 | ............. | G10L 15/22 |

(Continued)

OTHER PUBLICATIONS

First office action of Chinese application No. 201910684222.2 dated Jun. 15, 2021.

(Continued)

*Primary Examiner* — Mohammad K Islam
(74) *Attorney, Agent, or Firm* — Fay Sharpe LLP

(57) ABSTRACT

Disclosed are an automatic question answering method and apparatus, a storage medium, and a server. The method includes: acquiring numerical features of a sentence to be queried; querying a target sentence in a question database according to the numerical features of the sentence to be queried, the question database including a plurality of sentences and answers corresponding to the plurality of sentences; and determining a target answer according to an answer corresponding to the target sentence. In this method, the sentence is represented by the numerical features, such that it is convenient to search questions similar to a question of a user in the question database, thereby achieving an effect of improving a search speed of the question.

18 Claims, 8 Drawing Sheets

(56) References Cited

U.S. PATENT DOCUMENTS

| | | | | |
|---|---|---|---|---|
| 2017/0103324 A1* | 4/2017 | Weston | ................. | G06F 16/285 |
| 2019/0005090 A1* | 1/2019 | Zhang | ................. | G06F 16/3329 |
| 2019/0188316 A1 | 6/2019 | Huang et al. | | |
| 2019/0243900 A1* | 8/2019 | Gan | ...................... | G06F 40/30 |
| 2019/0392824 A1* | 12/2019 | Koo | ..................... | G10L 15/197 |

FOREIGN PATENT DOCUMENTS

| | | | | | |
|---|---|---|---|---|---|
| CN | 106570708 A | | 4/2017 | | |
| CN | 106844344 A | | 6/2017 | | |
| CN | 106844530 A | | 6/2017 | | |
| CN | 108536708 A | * | 9/2018 | ............. | G06F 16/00 |
| CN | 108922634 A | * | 11/2018 | | |
| CN | 109471927 A | * | 3/2019 | ........... | G06F 40/289 |
| CN | 109543020 A | * | 3/2019 | ........ | G06F 17/2785 |
| CN | 110019741 A | | 7/2019 | | |
| CN | 109492077 B | * | 9/2020 | | |
| CN | 112100344 A | * | 12/2020 | | |
| JP | 2004127086 A | * | 4/2004 | | |
| JP | 2004280323 A | * | 10/2004 | | |
| JP | 2004355550 A | * | 12/2004 | | |
| JP | 4176228 B2 | * | 11/2008 | ......... | G06F 17/2765 |
| JP | 4228442 B2 | * | 2/2009 | | |
| KR | 101775559 B1 | * | 1/2017 | ............. | G06F 17/27 |
| WO | WO-2021050170 A1 | * | 3/2021 | ........... | G06K 9/6256 |

OTHER PUBLICATIONS

Chao Xing, The Design and Implementation of Intelligent Question and Answering System; China Excellent Master's Thesis Full-text Database (Information Technology Series) Issue 10, Oct. 15, 2015, pp. 138-182.

* cited by examiner

AUTOMATIC QUESTION ANSWERING METHOD AND APPARATUS, STORAGE MEDIUM AND SERVER

This application claims priority to Chinese Patent Application No. 201910684222.2, filed on Jul. 26, 2019 and entitled "AUTOMATIC QUESTION ANSWERING METHOD AND APPARATUS, STORAGE MEDIUM AND ELECTRONIC DEVICE", the entire contents of which are incorporated herein by reference.

TECHNICAL FIELD

The present disclosure relates to the field of automatic question answering, and more particularly to an automatic question answering method and apparatus, a storage medium and a server.

BACKGROUND

A question answering system (QA) is capable of accurately and concisely answering, in natural languages, questions asked by a user in such languages. That is, the user puts forward an information query request in the form of a natural language question, and the system automatically finds an accurate answer from various data resources by analyzing the question, and feeds the answer back to the user.

In an automatic question answering method, in response to acquiring the user's question, a sentence of the question is compared with that of each question in a question database; and when a question whose sentence similarity reaches a specified threshold is found in the question database, an answer to the question is fed back to the user.

SUMMARY

Embodiments of the present disclosure provide an automatic question answering method and apparatus, a storage medium and a server. The technical solutions are as follows.

According to one aspect of the present disclosure, an automatic question answering method is provided. The method includes:

acquiring numerical features of a sentence to be queried, the numerical features of the sentence being features of a plurality of numerical values determined based on the sentence;

querying a target sentence in a question database according to the numerical features of the sentence to be queried, the question database including a plurality of sentences and answers corresponding to the plurality of sentences, and the target sentence being a sentence whose numerical features are matched with the numerical features of the sentence to be queried; and determining a target answer according to an answer corresponding to the target sentence.

Optionally, the numerical features of the sentence to be queried belong to the same type; and prior to querying the target sentence in the question database according to the numerical features of the sentence to be queried, the method further includes:

determining a value range of numerical features of the plurality of sentences in the question database according to the type of the numerical features;

dividing the value range into a plurality of intervals; and acquiring a mapping relationship between the plurality of intervals and the plurality of sentences in the question database, each of the intervals in the mapping relationship corresponding to at least one sentence in the question database.

Optionally, querying the target sentence in the question database according to the numerical features of the sentence to be queried includes:

determining a target interval to which the numerical features of the sentence to be queried belongs in the plurality of intervals; and determining a sentence corresponding to the target interval as the target sentence according to the mapping relationship.

Optionally, the sentence to be queried includes at least two types of numerical features; and prior to querying the target sentence in the question database according to the numerical features of the sentence to be queried, the method further includes:

determining value ranges of the at least two types of the numerical features of the plurality of sentences in the question database respectively according to the types of the at least two types of the numerical features, dividing the value ranges of the at least two types of the numerical features into a plurality of intervals respectively; and acquiring a mapping relationship between the plurality of sentences in the question database and the plurality of intervals of the value range of each type of the numerical features, each interval in the mapping relationship corresponding to at least one sentence in the question database.

Optionally, querying the target sentence in the question database according to the numerical features of the sentence to be queried includes:

determining at least two target intervals of the at least two types of the numerical features of the sentence to be queried in the value ranges of the at least two types of the numerical features respectively;

acquiring at least two sentences corresponding to the at least two target intervals according to the mapping relationship; and determining a repeated sentence in the at least two sentences as the target sentence.

Optionally, determining the at least two target intervals of the at least two types of the numerical features of the sentence to be queried in the value ranges of the at least two types of the numerical features respectively includes:

determining at least two belonging intervals of the at least two types of the numerical features of the sentence to be queried in the value ranges of the at least two types of the numerical features respectively and intervals adjacent to the at least two belonging intervals as the target intervals.

Optionally, determining the at least two belonging intervals of the at least two types of the numerical features of the sentence to be queried in the value ranges of the at least two types of the numerical features respectively and the intervals adjacent to the at least two belonging intervals as the target intervals includes:

determining the at least two belonging intervals of the at least two types of the numerical features of the sentence to be queried in the value ranges of the at least two types of the numerical features respectively and two intervals adjacent to each of the belonging intervals as the target intervals.

Optionally, the numerical features include at least one of a mean, a variance, a covariance and a mathematical expectation.

Optionally, prior to acquiring the numerical features of the sentence to be queried, the method further includes:

acquiring the sentence to be queried from a user terminal; and converting the sentence to be queried into a vector including a plurality of numerical values.

Optionally, acquiring the sentence to be queried at the user terminal includes:

acquiring a question voice from the user terminal; and performing voice recognition on the question voice to obtain the sentence to be queried.

Optionally, in response to determining the target answer according to the answer corresponding to the target sentence, the method further includes:

providing the target answer for the user terminal.

According to another aspect of the present disclosure, an automatic question answering apparatus is provided. The apparatus includes: a processor and a memory; wherein the memory is configured to store at least one computer program therein; and the processor is configured to run the at least one computer program to perform an automatic question answering method including:

acquiring numerical features of a sentence to be queried, the numerical features of the sentence being features of a plurality of numerical values determined based on the sentence;

querying a target sentence in a question database according to the numerical features of the sentence to be queried, the question database including a plurality of sentences and answers corresponding to the plurality of sentences, and the target sentence being a sentence whose numerical features are matched with the numerical features of the sentence to be queried; and determining a target answer according to an answer corresponding to the target sentence.

Optionally, the numerical features of the sentence to be queried belong to the same type; and prior to querying the target sentence in the question database according to the numerical features of the sentence to be queried, the automatic question answering method performed by the processor when running the at least one computer program further includes:

determining a value range of numerical features of the plurality of sentences in the question database according to the type of the numerical features, dividing the value range into a plurality of intervals, and acquiring a mapping relationship between the plurality of intervals and the plurality of sentences in the question database, each of the intervals in the mapping relationship corresponding to at least one sentence in the question database.

Optionally, querying the target sentence in the question database according to the numerical features of the sentence to be queried includes:

determining a target interval to which the numerical features of the sentence to be queried belongs in the plurality of intervals; and determining a sentence corresponding to the target interval as the target sentence according to the mapping relationship.

Optionally, the sentence to be queried includes at least two types of numerical features; and prior to querying the target sentence in the question database according to the numerical features of the sentence to be queried, the automatic question answering method implemented by the processor executing the computer program stored on the memory further includes:

determining value ranges of the at least two types of the numerical features of the plurality of sentences in the question database respectively according to the types of the at least two types of the numerical features, dividing the value ranges of the at least two types of the numerical features into a plurality of intervals respectively, and acquiring a mapping relationship between the plurality of sentences in the question database and the plurality of intervals of the value range of each type of the numerical features, each interval in the mapping relationship corresponding to at least one sentence in the question database.

Optionally, querying the target sentence in the question database according to the numerical features of the sentence to be queried includes:

determining at least two target intervals of the at least two types of the numerical features of the sentence to be queried in the value ranges of the at least two types of the numerical features respectively;

acquiring at least two sentences corresponding to the at least two target intervals according to the mapping relationship; and determining a repeated sentence in the at least two sentences as the target sentence.

Optionally, determining the at least two target intervals of the at least two types of the numerical features of the sentence to be queried in the value ranges of the at least two types of the numerical features respectively includes:

determining at least two belonging intervals of the at least two types of the numerical features of the sentence to be queried in the value ranges of the at least two types of the numerical features respectively and intervals adjacent to the at least two belonging intervals as target intervals.

Optionally, determining the at least two belonging intervals of the at least two types of the numerical features of the sentence to be queried in the value ranges of the at least two types of the numerical features respectively and the intervals adjacent to the at least two belonging intervals as the target intervals includes:

determining the at least two belonging intervals of the at least two types of the numerical features of the sentence to be queried in the value ranges of the at least two types of the numerical features respectively and two intervals adjacent to each of the belonging intervals as the target intervals.

Optionally, prior to acquiring the numerical features of the sentence to be queried, the automatic question answering method implemented by the processor executing the computer program stored on the memory further includes:

acquiring the sentence to be queried from a user terminal; and converting the sentence to be queried into a vector including a plurality of numerical values.

Optionally, acquiring the sentence to be queried at the user terminal includes:

acquiring a question voice from the user terminal; and performing voice recognition on the question voice to obtain the sentence to be queried.

Optionally, in response to determining the target answer according to the answer corresponding to the target sentence, the automatic question answering method performed by the processor when running the at least one computer program includes:

providing the target answer for the user terminal.

According to still another aspect of the present disclosure, a storage medium storing at least one instruction therein is provided. The at least one instruction, when executed by a processor of an automatic question answering apparatus, enables the processor to perform an automatic question answering method including:

acquiring a sentence to be queried;

acquiring numerical features of a sentence to be queried, the numerical features of the sentence being features of a plurality of numerical values determined based on the sentence;

querying a target sentence in a question database according to the numerical features of the sentence to be queried, the question database including a plurality of sentences and answers corresponding to the plurality of sentences, and the target sentence being a sentence whose numerical features are matched with the numerical features of the sentence to be queried; and determining a target answer according to an answer corresponding to the target sentence.

According to yet still another aspect, a server is provided. The server includes the above automatic question answering apparatus.

BRIEF DESCRIPTION OF THE DRAWINGS

The accompanying drawings, which are incorporated in and constitute a part of this description, illustrate embodiments consistent with the present disclosure and, together with the description, serve to explain the principles of the present disclosure.

Figure 1:
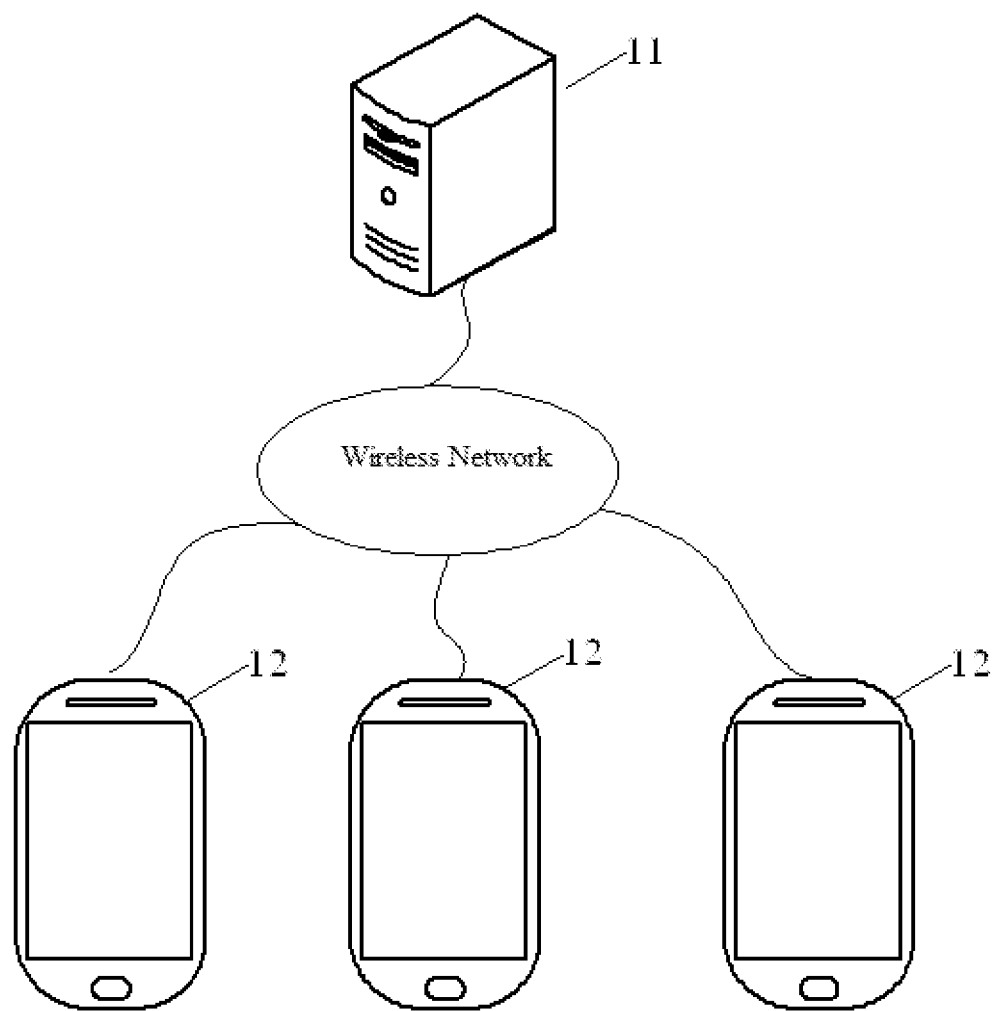
FIG. 1 is a schematic diagram of an implementation environment of an automatic question answering method according to an embodiment of the present disclosure.

The specific embodiments of the present disclosure have been shown through the above drawings, and will be described in more detail below. These drawings and textual descriptions are not intended to limit the concept scope of the present disclosure through any means, but are used to illustrate the concept of the present disclosure to those skilled in the art by reference to the specific embodiments.

DETAILED DESCRIPTION

Exemplary embodiments will be described in detail herein, examples of which are illustrated in the drawings. The following description refers to the drawings in which the same numbers in different drawings represent the same or similar elements unless otherwise indicated. The embodiments set forth in the following description of exemplary embodiments do not represent all implementations consistent with the present disclosure. Instead, they are merely examples of apparatuses and methods consistent with aspects related to the present disclosure as recited in the appended claims.

At present, automatic question answering technology has been widely applied to many industries. The automatic question answering technology based on frequently asked questions (FAQs) can directly answer the FAQs in the industry in a natural language.

However, the above automatic question answering system is relatively complicated in flow, and more numerous in retrieval steps. In addition, it is necessary to compare the similarity between a question of a user and each question in the database to find the most similar question. This process takes a long time due to the comparison of a large number of questions. As a result, it takes long to generate a final question, and feedback of the question is slower.

FIG. 1 is a schematic diagram of an implementation environment of an automatic question answering method according to the present disclosure. The implementation environment may include a server 11 and a terminal 12.

The server 11 may be a server or a server cluster.

The terminal 12 may be a terminal such as a mobile phone, a tablet computer, a notebook computer, or a smart wearable device, and may be connected to the server in a wired or wireless manner (FIG. 1 shows the case of wireless connection).

Figure 2:
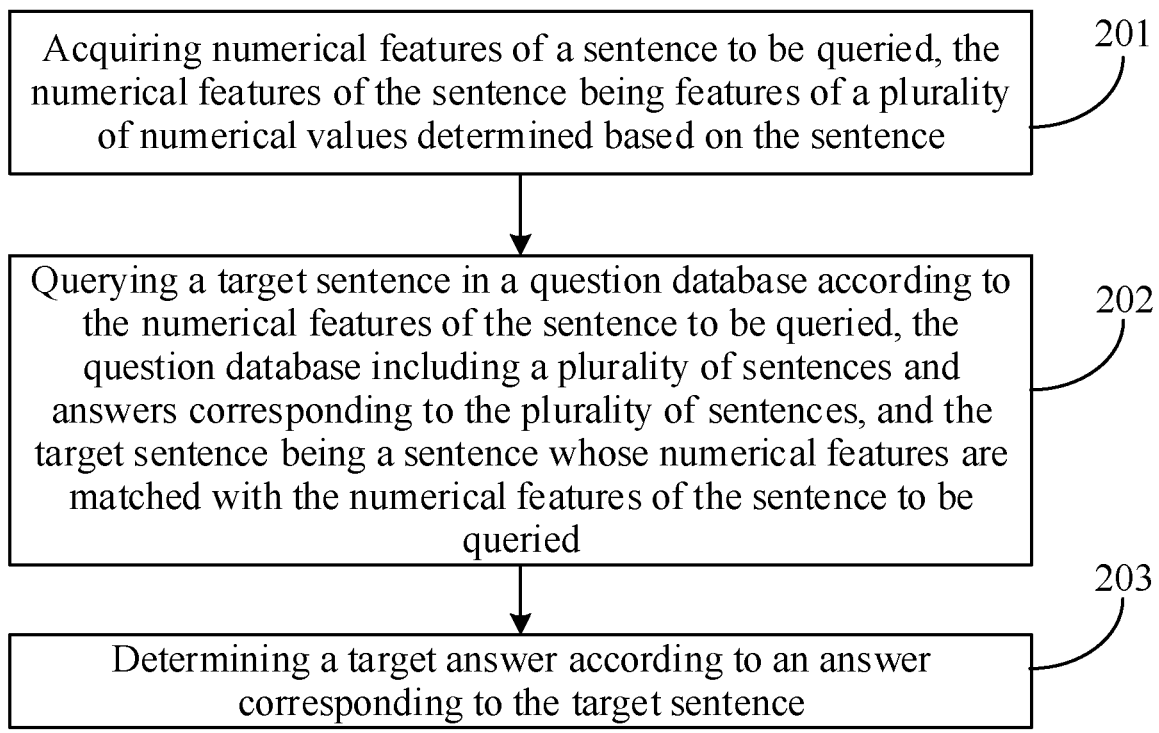
FIG. 2 is a flowchart of an automatic question answering method according to an embodiment of the present disclosure.

FIG. 2 is a flowchart of an automatic question answering method according to an embodiment of the present disclosure. The automatic question answering method includes the following steps.

In step 201, numerical features of a sentence to be queried are acquired, wherein the numerical features of the sentence are features of a plurality of numerical values determined based on the sentence.

The sentence to be queried may be from a user terminal. For the sentences, reference may be made to various sentences involved in the embodiments of the present disclosure, such as the sentence to be queried and a target sentence involved hereinafter.

In step 202, a target sentence is queried in a question database according to the numerical features of the sentence to be queried, wherein the question database includes a plurality of sentences and answers corresponding to the plurality of sentences, and the target sentence is a sentence whose numerical features are matched with the numerical features of the sentence to be queried.

In step 203, a target answer is determined according to an answer corresponding to the target sentence.

In summary, in the automatic question answering method according to the embodiment of the present disclosure, the sentence is identified by the numerical features of a plurality of numerical values determined based on the sentence, and the matching target sentence and the answer are queried in the question database according to the numerical features. As the sentence is represented by the numerical features in the method, it is convenient to search sentences similar to the sentence to be queried in the question database. Thus, the calculating quantity is less, thereby achieving an effect of improving a search speed of the question.

The following cases will be respectively explained according to the different numbers of types of the numerical features.

Figure 3:
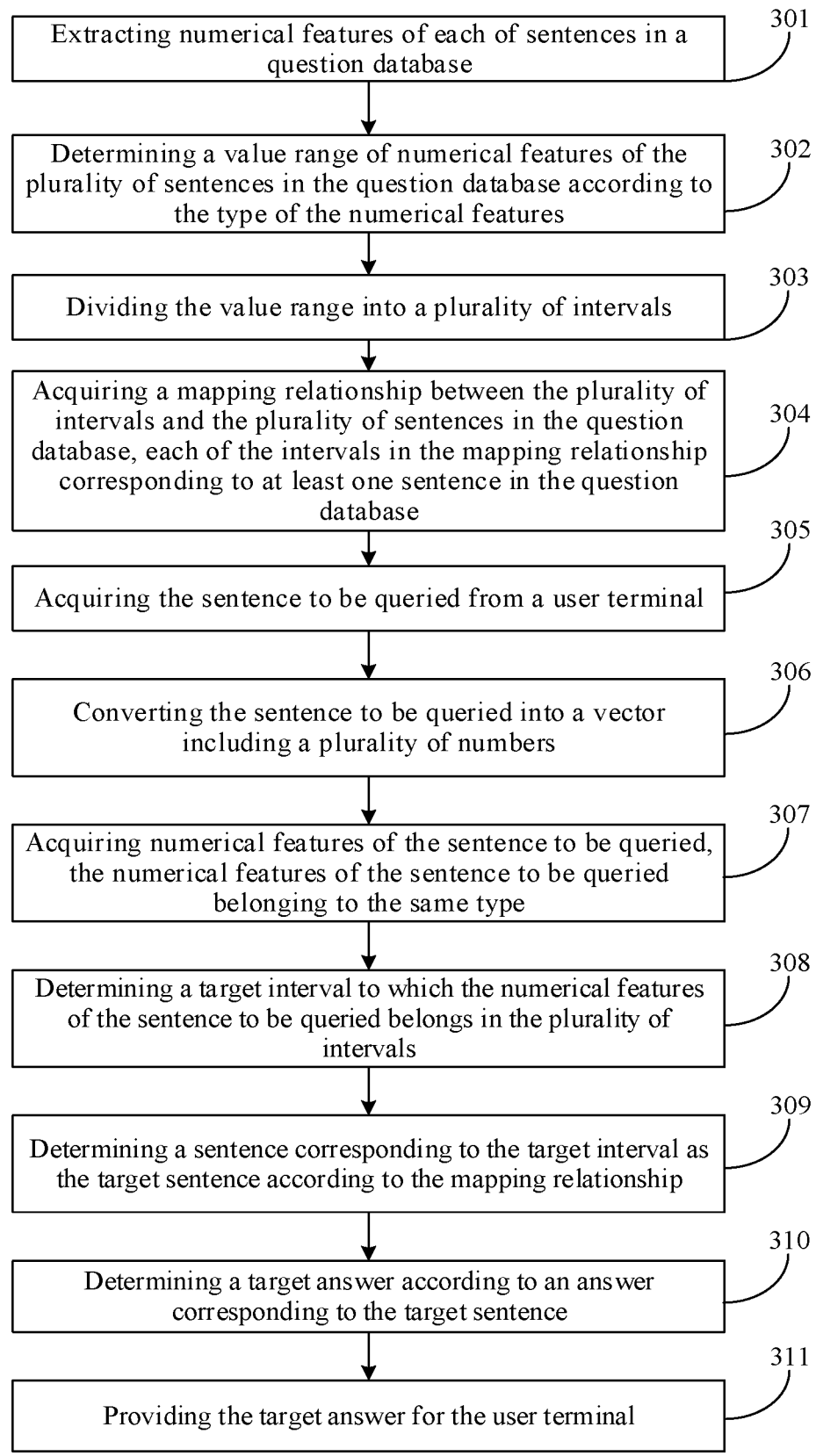
FIG. 3 is a flowchart of another automatic question answering method according to an embodiment of the present disclosure.

FIG. 3 shows a case that the numerical features belong to the same type. FIG. 3 is a flowchart of another automatic question answering method according to an embodiment of the present disclosure. This method is applicable to the server in the implementation environment shown in FIG. 1. The automatic question answering method includes the following steps.

In step 301, numerical features of each of sentences in a question database are extracted.

The server may first convert each of the sentences in the question database into a vector including a plurality of numerical values, and then obtain the numerical features of each sentence by calculating the plurality of numerical values in each vector. The numerical features may include one of a mean, a variance, a covariance, and a mathematical expectation. The mean refers to the value representing the average feature of a series of data or statistical population. The variance is the average of the sum of squares of deviations of each data and its arithmetic mean. The covariance represents the variance of the overall error of two variables. The mathematical expectation is sum of products of all possible values of discrete random variables and the corresponding probabilities.

Exemplarily, the vector of a sentence in the question database is a vector including a plurality of numerical values, and the converted vector is X:

$$X=\{x1, x2, \ldots xn\}, 0<=x1, x2, \ldots, xn<=1.$$

Where x1, x2 ... and xn are all numerical values, and each in a value range of between 0 and 1. There may be various conversion manners, such as term frequency-inverse document frequency (TF-IDF) technology. When the sentence is converted into the vector, the value range of the numerical values is generally between 0 and 1. When the type of numerical features is the mean, a mean formula used for calculation is as follows:

$$\bar{x} = \frac{x_1 + x_2 + \ldots + x_n}{n} = \frac{\sum_{i=1}^{n} x_i}{n}.$$

When the type of numerical features is the variance, a variance formula used for calculation is as follows:

$$D(X)=E\{[X-E(X)]^2\}=E\{X^2-2XE(X)+[E(X)]^2\}.$$

In step 302, a value range of numerical features of the plurality of sentences in the question database is determined according to the type of the numerical features.

Different types of numerical features respectively have corresponding value ranges. The server may determine the value range of the numerical features according to the type of the numerical features and the value range of the numerical values in the vector.

For example, when the values of the plurality of numerical values x1, x2 ... and xn in the vector are all numerical values between 0 and 1, the type of the numerical features is determined as the mean with the value range of [0, 1]. Similarly, when the values of the plurality of numerical values x1, x2 ... and xn in the vector are all numbers between 0 and 1, the type of the numerical features is determined as the variance, wherein the value range of the variance is set to [0, 1].

In step 303, the value range is divided into a plurality of intervals.

The server divides the value range into the intervals to save retrieval time. Meanwhile, it can also facilitate matching between the numerical features of the question sentence from the user terminal and the numerical features of the sentence in the question database. All intervals may be intervals of equal length or unequal lengths. The number of intervals may be set according to the design accuracy. The greater the number of intervals is, the higher the accuracy of the subsequently determined target sentence is; or the smaller the number of intervals is, the lower the accuracy of the subsequently determined target sentence is.

In an optional embodiment of the present disclosure, when the type of the numerical features is the mean, for example, may be divided into five intervals: [0,0.2], (0.2, 0.4], (0.4, 0.6), (0.6, 0.8), and (0.8, 1) respectively.

When the type of the numerical features is the variance, the value range [0, 1] of the variance may be divided into 100 parts which may have numerical identifiers of 1-100 in ascending order. The numerical identifier of the value range [0, 0.01] is 1, and the numerical identifier of the value range [0.01, 0.02] is 2. The numerical identifiers may be used as an index to facilitate subsequent search. In addition, the value range may also be divided into intervals of other quantities, which is not limited in the embodiments of the present disclosure.

In step 304, a mapping relationship between the plurality of intervals and the plurality of sentences in the question database is acquired, wherein each of the intervals in the mapping relationship corresponds to at least one sentence in the question database.

The server may determine the interval corresponding to each sentence according to the numerical features of the plurality of numerical values in the vector of the sentence. The mapping relationship may include a correspondence between the sentences and the intervals in the question database. Exemplarily, if the mean of the plurality of numerical values in the vector of a sentence in the question database is 0.15 and the value range includes the above five intervals of [0, 0.2], (0.2, 0.4], (0.4, 0.6], (0.6, 0.8), and (0.8, 1), the sentence corresponds to the interval [0, 0.2].

When dividing the intervals, the server may ensure that each interval corresponds to at least one sentence in the question database, such that it is ensured that each interval includes a corresponding question, thereby avoiding a situation where no corresponding question is found in an interval.

In step 305, the sentence to be queried is acquired from a user terminal.

The user may use a text input or voice input function on the user terminal to input a question he/she cares to the user terminal, and the user terminal sends the question to the server, that is, the server may acquire the user's question sentence from the user terminal. When acquiring the question voice from the user terminal, the server may use a voice recognition system to perform voice recognition on the question voice of the user to obtain the sentence to be queried.

In step 306, the sentence to be queried is converted into a vector including a plurality of numerical values.

The server may convert the sentence to be queried from the user terminal into the vector. For details of the conversion, reference may be made to step 301, which are not repeated in the embodiment of the present disclosure.

In step 307, numerical features of the sentence to be queried are acquired, wherein the numerical features of the sentence to be queried belong to the same type.

The server may obtain the numerical features of the sentence to be queried according to the plurality of numerical values in the vector obtained in step 306, wherein the type of the numerical features is the same as that of the numerical features of the sentence extracted from the question database in step 301.

In step 308, a target interval to which the numerical features of the sentence to be queried belongs is determined in the plurality of intervals.

When determining the target interval to which the numerical features of the sentence to be queried belongs in the plurality of intervals, the server may not only determine the interval where the numerical features fall as the target interval, but also determine the intervals adjacent to the interval where the numerical features fall as the target intervals, so as to prevent related questions from missing during the retrieval process, for example, the three intervals including the interval where the numerical features fall and the two intervals adjacent to the interval where the numerical features fall can be determined as the target intervals.

In an optional embodiment of the present disclosure, if a calculation result of the mean is 0.53, (0.4, 0.6) is determined as the target interval; and (0.2, 0.4) and (0.6, 0.8) adjacent to (0.4, 0.6) may also be determined as the target intervals.

In step 309, a sentence corresponding to the target interval is determined as the target sentence according to the mapping relationship.

The server may determine one or more sentences whose numerical features fall in the target interval in the question database as the sentence(s) whose numerical features are matched with those of the sentence to be queried from the user terminal, namely, the target sentence. In step 310, a target answer is determined according to an answer corresponding to the target sentence.

In response to determining the target sentence, the server may search the answer corresponding to the target sentence in the question database, and determine the answer as the target answer.

Optionally, when the target sentence includes a plurality of sentences, the plurality of sentences corresponds to a plurality of answers accordingly, and the server may determine the plurality of answers as the target answers, or may determine one of the answers as the target answer.

In step 311, the target answer is provided for the user terminal.

The server may provide various forms of target answers for the user terminal. For example, when the target answer in the question database is in the form of an text, the server may send the target answer in the text form to the user terminal; or, the server may use voice synthesis technology to acquire a voice answer corresponding to the target answer according to the target answer, and then send the voice answer to the user terminal; or, the server may also acquire a picture file corresponding to the target answer, and then send the picture file to the user terminal.

By the end of step 311, the server has realized the feedback to the user's question. The method according to this embodiment has less retrieval workload, and higher retrieval speed and accuracy.

It should be noted that the order of the steps in the automatic question answering method in the embodiment of the present disclosure may be appropriately adjusted, and the steps may also be increased or decreased according to situations. For example, steps 302 to 304 may be performed prior to step 308, or may be performed between steps 306 and 307, or may be performed simultaneously with steps 305 to 307. Change methods which can be easily expected by any person skilled in the art within the technical scope disclosed by the present disclosure should be covered by the protection scope of the present disclosed, and thus will not be repeated herein.

In summary, in the automatic question answering method according to the embodiment of the present disclosure, the sentence is identified by the numerical features of the plurality of numerical values determined based on the sentence, and the matching target sentence and the answer are queried in the question database according to the numerical features. As the sentence is represented by the numerical features in the method, it is convenient to search sentences similar to the sentence to be queried in the question database. Thus, the calculating quantity is less, thereby achieving an effect of improving a search speed of the question.

Figure 4:
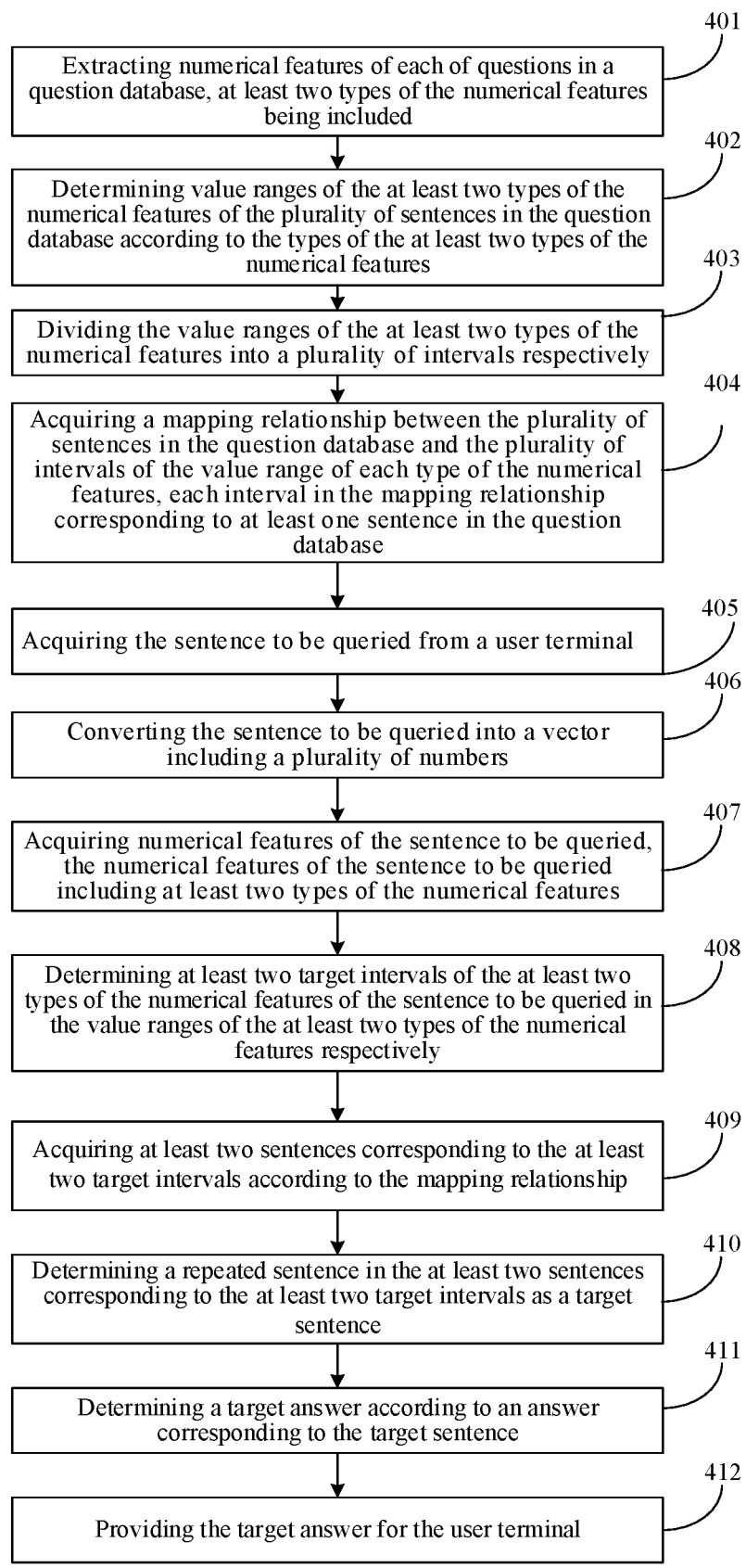
FIG. 4 is a flowchart of yet another automatic question answering method according to an embodiment of the present disclosure.

FIG. 4 shows at least two types of numerical features. FIG. 4 is a flowchart of yet another automatic question answering method according to an embodiment of the present disclosure. This method is applicable to the server in the implementation environment shown in FIG. 1. The automatic question answering method includes the following steps.

In step 401, numerical features of each of questions in a question database are extracted; and at least two types of the numerical features are included.

The numerical features may include at least two of a mean, a variance, a covariance and a mathematical expectation. The mean refers to the value representing the average feature of a series of data or statistical population. The variance is the average of the sum of squares of deviations of each data and its arithmetic mean. The covariance represents the variance of the overall error of two variables. The mathematical expectation is sum of products of all possible values of discrete random variables and the corresponding probabilities. In an optional embodiment of the present disclosure, the mean and the variance are used as the numerical features, but in other optional embodiments of the present disclosure, more than two numerical features may also be used, which is not limited in the embodiments of the present disclosure herein.

The server may convert the sentence of each question in the database into a vector; the vector is a vector including a plurality of numerical values; and the converted question vector is X:

$$X=\{x1, x2, \ldots, xn\}, 0 <= x1, x2, \ldots, xn <= 1.$$

$x1, x2 \ldots$ and $xn$ are all numerical values, and each in a value range of between 0 and 1. For details of the conversion, reference may be made to the related technologies, such as term frequency-inverse document frequency (TF-IDF) technology. When the question sentence is converted into the vector, the value range of the numerical values is generally between 0 and 1. A mean formula used for calculation is as follows:

$$\overline{x} = \frac{x_1 + x_2 + \ldots + x_n}{n} = \frac{\sum_{i=1}^{n} x_i}{n}.$$

A variance formula used for calculation is as follows:

$$D(X) = E\{[X-E(X)]^2\} = E\{X^2 - 2XE(X) + [E(X)]^2\}.$$

In step 402, value ranges of the at least two types of the numerical features of the plurality of sentences in the question database are determined according to the types of the at least two types of the numerical features.

Different types of numerical features respectively have corresponding value ranges. The server may determine the value range of each type of the numerical features according to the type of the numerical features and the value range of the numerical values in the vector.

For example, when the values of the plurality of numerical values x1, x2 . . . and xn in the vector are all numerical values between 0 and 1, the type of the numerical features is determined as the mean with the value range of [0, 1]. Similarly, when the values of the plurality of numerical values x1, x2 . . . and xn in the vector are all numbers between 0 and 1, the type of the numerical features is determined as the variance, wherein the value range of the variance is set to [0, 1].

In step 403, the value ranges of the at least two types of the numerical features are divided into a plurality of intervals respectively.

Each type of the numerical features has a value range; and the server may divide the value range of each type of the numerical features into a plurality of intervals.

The server divides the value range into the intervals to save retrieval time. Meanwhile, this also facilitates matching between the numerical features of the question sentence from the user terminal and the numerical features of the sentence in the question database. All intervals may be intervals of equal length or unequal lengths. The number of intervals may be set according to the design accuracy. The greater the number of intervals is, the higher the accuracy of the subsequently determined target sentence is; or the smaller the number of intervals is, the lower the accuracy of the subsequently determined target sentence is.

In an optional embodiment of the present disclosure, when the types of the numerical features are the mean and the variance, the value range [0, 1] of the mean may be divided into five intervals: [0, 0.2], (0.2, 0.4], (0.4, 0.6], (0.6, 0.8], and (0.8, 1) respectively.

The value range [0, 1] of the variance may be divided into 100 intervals, and the length of each interval is 0.01. Moreover, the server may also identify the all intervals with numerical identifiers of 1 to 100 in ascending order. For example, the numerical identifier of the value range [0, 0.01] is 1, the numerical identifier of the value range [0.01, 0.02] is 2, and so on. The numerical identifiers may be used as an index to facilitate subsequent search. In addition, the value range may also be divided into intervals of other quantities, which is not limited in the embodiments of the present disclosure.

In step 404, a mapping relationship between the plurality of sentences in the question database and the plurality of intervals of the value range of each type of the numerical features is acquired, wherein each interval in the mapping relationship corresponds to at least one sentence in the question database.

The server may determine the interval corresponding to each sentence according to the all numerical features of the plurality of numerical values in the vector of the sentence. The mapping relationship may include a correspondence between the sentences and the intervals in the question database. Exemplarily, if the mean and the variance of the plurality of numerical values in the vector of a sentence in the question database are 0.15 and 0.1 respectively, and the value range of the mean includes the above five intervals of [0, 0.2], (0.2, 0.4], (0.4, 0.6], (0.6, 0.8] and (0.8, 1) and the value range of the variance includes 10 equal-length intervals each with the length of 0.1, the mean of the sentence corresponds to the interval [0, 0.2], and the variance of the sentence corresponds to the interval [0, 0.1].

When dividing the intervals, the server may ensure that each interval of each type of the numerical features corresponds to at least one sentence in the question database, such that it is ensured that each interval includes a corresponding question, thereby avoiding a situation where no corresponding question is found in an interval.

In this embodiment, multiple types of numerical features are provided, such that each type of the numerical features may be subject to a mapping relationship. The mapping relationship of each type of the numerical features may include a correspondence between each statement in the question database and a certain interval among the multiple intervals of this type of the numerical features.

In step 405, the sentence to be queried is acquired from a user terminal.

The user can use a text input or voice input function on the user terminal to input a question he/she cares to the user terminal, and the user terminal sends the question to the server, that is, the server may acquire the user's question sentence from the user terminal. When acquiring the question voice from the user terminal, the server may use a voice recognition system to perform voice recognition on the question voice of the user to obtain the sentence to be queried.

The sentence to be queried of the user is converted into the vector represented by the numerical values. For details, reference may be made to step 301, which are not repeated in the embodiment of the present disclosure herein.

In step 406, the sentence to be queried is converted into a vector including a plurality of numerical values.

The server may convert the sentence to be queried from the user terminal into the vector. For details of the conversion, reference may be made to step 301, which are not repeated in the embodiment of the present disclosure herein.

In step 407, numerical features of the sentence to be queried are acquired, wherein the numerical features of the sentence to be queried include at least two types of the numerical features.

The server may obtain the at least two types of the numerical features of the sentence to be queried according to the plurality of numerical values in the vector obtained in step 406, wherein the at least two types of the numerical features are the same as those of the numerical features of the sentence extracted from the question database in step 401.

In step 408, at least two target intervals of the at least two types of the numerical features of the sentence to be queried in the value ranges of the at least two types of the numerical features are determined respectively.

In the at least two numerical features of the sentence to be queried, each type of the numerical features has a target interval in the plurality of intervals of the value range of this type of the numerical features, such that the at least two types of the numerical features correspond to the at least two target intervals.

The server may determine at least two belonging intervals of the at least two types of the numerical features of the sentence to be queried in the plurality of intervals of the value ranges of the at least two types of the numerical features respectively and intervals adjacent to the at least two belonging intervals as the target intervals. That is, for each type of the numerical features of the sentence to be queried, the server may not only determine the interval where the numerical features fall as the target interval, but also determine the intervals adjacent to the interval where the numerical features fall as the target intervals, so as to prevent related questions from missing. For example, the three intervals including the interval where the numerical features fall and the two intervals adjacent to the interval where the numerical features fall can be determined as the target intervals.

In an optional embodiment of the present disclosure, if a calculation result of the mean of the sentence to be queried is 0.53, (0.4, 0.6) is determined as the target interval; and meanwhile, (0.2, 0.4) and (0.6, 0.8) adjacent to (0.4, 0.6) may also be determined as the target intervals. Similarly, if a calculation result of the variance of the sentence to be queried is 0.52, (0.4, 0.6) is determined as the target interval; and meanwhile, (0.2, 0.4) and (0.6, 0.8) adjacent to (0.4, 0.6) may also be determined as the target intervals.

In step 409, at least two sentences corresponding to the at least two target intervals are acquired according to the mapping relationship.

The server may acquire the sentence corresponding to the target interval of each type of the numerical features of the sentence to be queried according to the mapping relationship of each type of the numerical features. Each target interval corresponds to at least one sentence, and at least two target intervals correspond to at least two sentences.

Exemplarily, if there are two types of numerical features, two target intervals are provided accordingly. If each target interval corresponds to 10 sentences, the server may obtain 20 sentences.

In step 410, a repeated sentence in the at least two sentences corresponding to the at least two target intervals is determined as the target sentence.

The server may determine the repeated sentence in the at least two sentences obtained in step 409 as the target sentence. The repeated sentence refers to the same sentence. According to the types of different numerical features, the sentences in the question database are respectively corresponding to a plurality of intervals of each type of the numerical features, such that there are repeated sentences in the sentences corresponding to different target intervals. Thus, the different numerical features are adopted to find the matching target sentence, and the server determines the repeated one or more sentences as the target sentence, thereby increasing the correlation between the target sentence and the sentence to be queried, and further improving the accuracy of the target answer determined subsequently.

In addition, there may a case that no repeated sentence exists in the at least two sentences corresponding to the at least two target intervals. In this case, a message for indicating that there is no corresponding answer may be fed back to the user terminal, or the at least two sentences corresponding to the at least two target intervals may be regarded as the target sentences.

In step 411, a target answer is determined according to an answer corresponding to the target sentence.

In response to determining the target sentence, the server may search the answer corresponding to the target sentence in the question database, and determine the answer as the target answer.

Optionally, when the target sentence includes a plurality of sentences, the plurality of sentences corresponds to a plurality of answers accordingly; and the server may determine the plurality of answers as the target answers, or may determine one of the answers as the target answer.

In step 412, the target answer is provided for the user terminal.

The server may provide various forms of target answers for the user terminal. For example, when the target answer in the question database is in the form of an text, the server may send the target answer in the text form to the user terminal; or, the server may use voice synthesis technology to acquire a voice answer corresponding to the target answer according to the target answer, and then send the voice answer to the user terminal; or, the server may also acquire a picture file corresponding to the target answer, and then send the picture file to the user terminal.

By the end of step 412, the server has realized the feedback to the user's question. The method according to this embodiment has less retrieval workload, and higher retrieval speed and accuracy.

It should be noted that the order of the steps in the automatic question answering method in the embodiment of the present disclosure may be appropriately adjusted, and the steps may also be increased or decreased according to situations. For example, steps 402 to 404 may be performed prior to step 408, or may be performed between steps 406 and 407, or may be performed simultaneously with steps 405 to 407. Method variations which can be easily expected by any person skilled in the art within the technical scope disclosed by the present disclosure should be covered by the protection scope of the present disclosed, and thus will not be repeated herein.

In summary, in the automatic question answering method according to the embodiment of the present disclosure, the sentence is identified by the numerical features of the plurality of numerical values determined based on the sentence, and the matching target sentence and the answer are queried in the question database according to the numerical features. As the sentence is represented by the numerical features in the method, it is convenient to search sentences similar to the sentence to be queried in the question database. Thus, the calculating quantity is less, thereby achieving an effect of improving a search speed of the question.

It should be noted that in the embodiment of the present disclosure, the server is used as the execution subject for description. However, in an optional embodiment of the present disclosure, the automatic question answering method may also be performed by the user terminal, which is not limited in the embodiment of the present disclosure.

Figure 5:
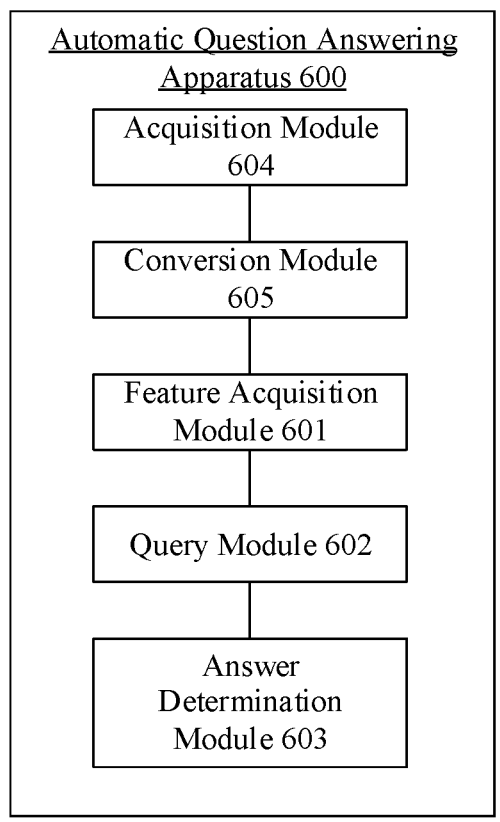
FIG. 5 is a structural block diagram of an automatic question answering apparatus according to an embodiment of the present disclosure.

FIG. 5 is a structural block diagram of an automatic question answering apparatus 600 according to an embodiment of the present disclosure. The automatic question answering apparatus 600 includes a feature acquiring module 601, a querying module 602, and an answer determining module 603.

The feature acquiring module 601 is configured to acquire numerical features of a sentence to be queried, wherein the numerical features of the sentence are features of a plurality of numerical values determined based on the sentence.

The querying module 602 is configured to query a target sentence in a question database according to the numerical features of the sentence to be queried, wherein the question database includes a plurality of sentences and answers corresponding to the plurality of sentences, and the target sentence is a sentence whose numerical features are matched with the numerical features of the sentence to be queried.

The answer determining module 603 is configured to determine a target answer according to an answer corresponding to the target sentence.

Figure 6:
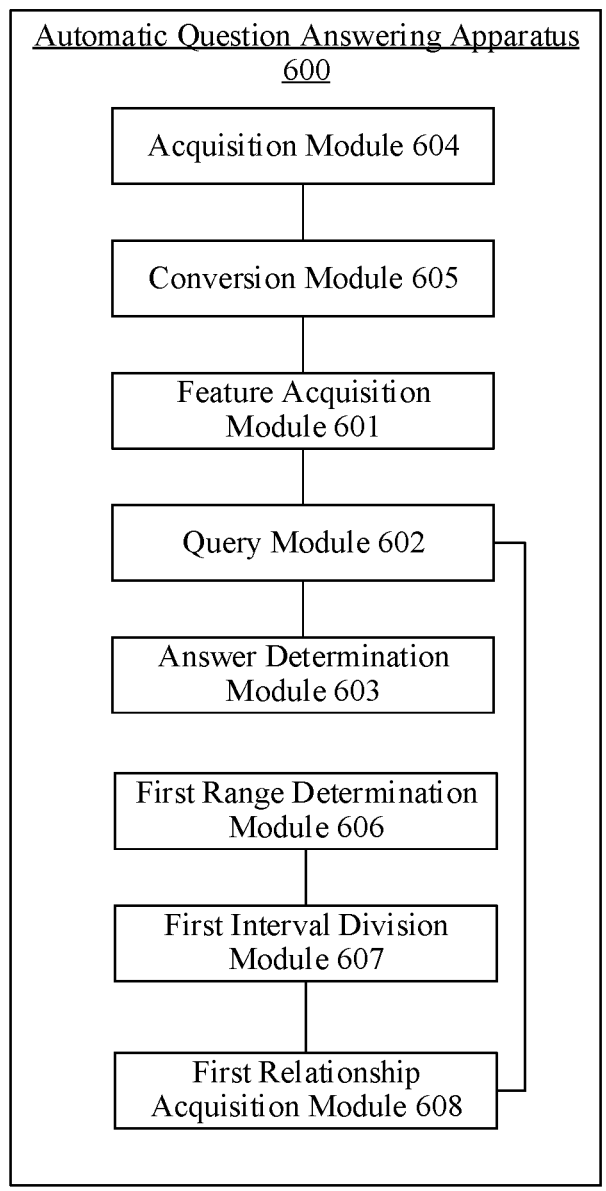
FIG. 6 is a structural block diagram of another automatic question answering apparatus according to an embodiment of the present disclosure.

Optionally, FIG. 6 is a structural block diagram of another automatic question answering apparatus 600 according to an embodiment of the present disclosure. If the numerical features of the sentence to be queried belong to the same type, the automatic question answering apparatus 600 further includes a first range determining module 606, a first interval dividing module 607, and a first relationship acquiring module 608.

The first range determining module 606 is configured to determine a value range of numerical features of the plurality of sentences in the question database according to the type of the numerical features.

The first interval dividing module 607 is configured to divide the value range into a plurality of intervals.

The first relationship acquiring module 608 is configured to acquire a mapping relationship between the plurality of intervals and the plurality of sentences in the question database, wherein each of the intervals in the mapping relationship corresponds to at least one sentence in the question database.

The query module 602 is configured to: determine a target interval to which the numerical features of the sentence to be queried belongs in the plurality of intervals; and determine a sentence corresponding to the target interval as the target sentence according to the mapping relationship.

Figure 7:
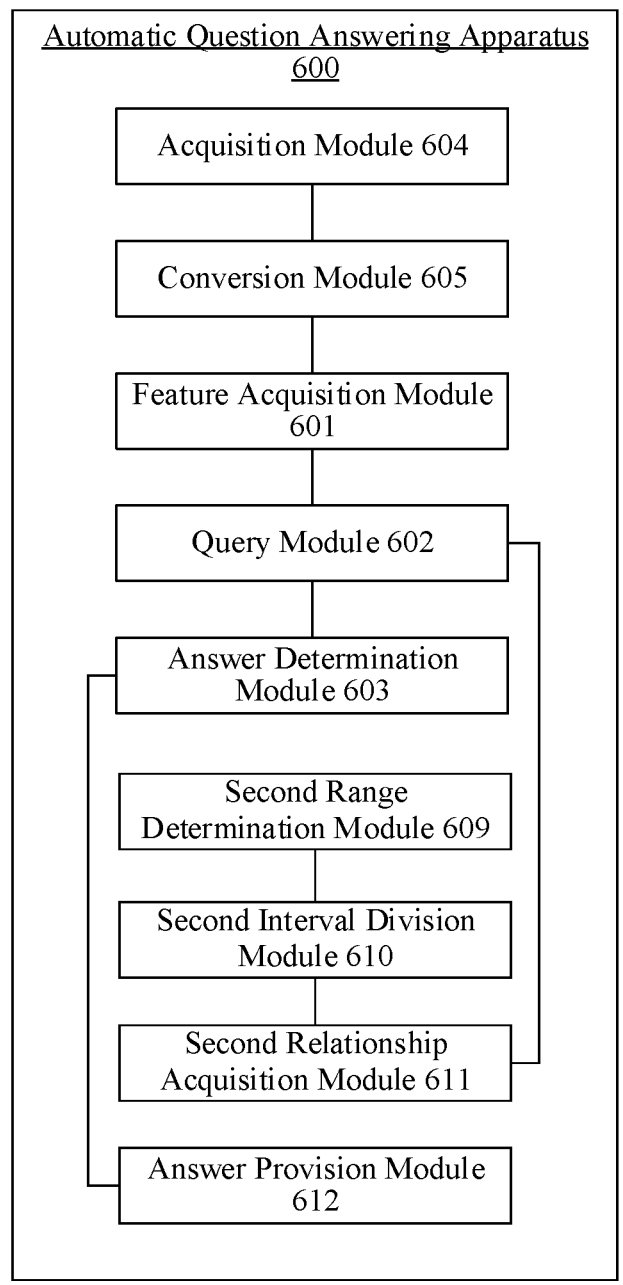
FIG. 7 is a structural block diagram of yet another automatic question answering apparatus according to an embodiment of the present disclosure.

Optionally, FIG. 7 is a structural block diagram of yet another automatic question answering apparatus 300 according to an embodiment of the present disclosure. If the sentence to be queried includes two types of numerical features, the automatic question answering apparatus 600 further includes a second range determining module 609, a second interval dividing module 610, and a second relationship acquiring module 611.

The second range determining module 609 is configured to determine value ranges of the at least two types of the numerical features of the plurality of sentences in the question database according to the types of the at least two types of the numerical features.

The second interval dividing module 610 is configured to divide the value ranges of the at least two types of the numerical features into a plurality of intervals respectively.

The second relationship acquiring module 611 is configured to acquire a mapping relationship between the plurality of sentences in the question database and the plurality of intervals of the value range of each type of the numerical features, wherein each interval in the mapping relationship corresponds to at least one sentence in the question database.

Figure 8:
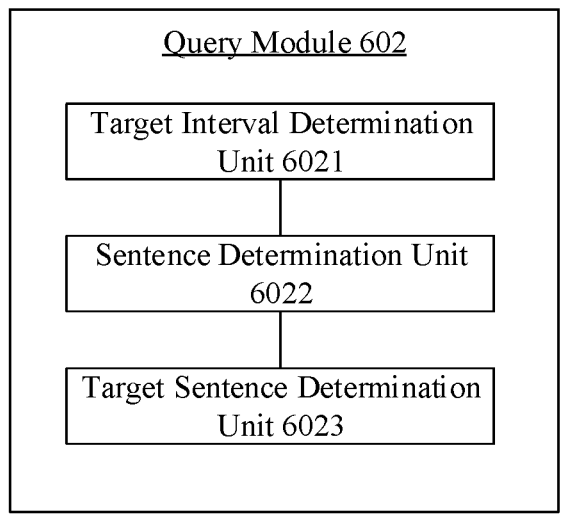
FIG. 8 is a structural block diagram of a query module in an automatic question answering apparatus according to an embodiment of the present disclosure.

As shown in FIG. 8, the query module 602 includes a target interval determining unit 3021, a sentence determining unit 6022, and a target sentence determining unit 6023.

The target interval determination unit 6021 is configured to determine at least two target intervals of the at least two types of the numerical features of the sentence to be queried in the value ranges of the at least two types of the numerical features respectively.

The sentence determining unit 6022 is configured to acquire at least two sentences corresponding to the at least two target intervals according to the mapping relationship.

The target sentence determining unit 6023 is configured to determine a repeated sentence in the at least two sentences as a target sentence.

Optionally, the target interval determining unit 6021 is configured to determine at least two belonging intervals of the at least two types of the numerical features of the sentence to be queried in the value ranges of the at least two types of the numerical features respectively and intervals adjacent to the at least two belonging intervals as the target intervals.

Optionally, the target interval determining unit 6021 is configured to determine the at least two belonging intervals of the at least two types of the numerical features of the sentence to be queried in the value ranges of the at least two types of the numerical features respectively and two intervals adjacent to each of the belonging intervals as the target intervals.

Optionally, the numerical features include at least one of a mean, a variance, a covariance, and a mathematical expectation.

Optionally, as shown in FIG. 5, the automatic question answering apparatus 600 further includes: an acquisition module 604, configured to acquire the sentence to be queried from a user terminal; and a conversion module 605, configured to convert the sentence to be queried into a vector including a plurality of numerical values.

Optionally, the acquiring module 601 is configured to acquire a question voice from the user terminal, and perform voice recognition on the question voice to obtain the sentence to be queried.

Optionally, as shown in FIG. 7, the automatic question answering apparatus 600 further includes: an answer providing module 612 configured to provide the target answer for the user terminal.

In summary, in the automatic question answering apparatus according to the embodiment of the present disclosure, the sentence is identified by the numerical features of the plurality of numerical values determined based on the sentence, and the matching target sentence and the answer are queried in the question database according to the numerical features. As the sentence is represented by the numerical features in the method, it is convenient to search sentences similar to the sentence to be queried in the question database. Thus, the calculating quantity is less, thereby achieving an effect of improving a search speed of the question.

Figure 9:
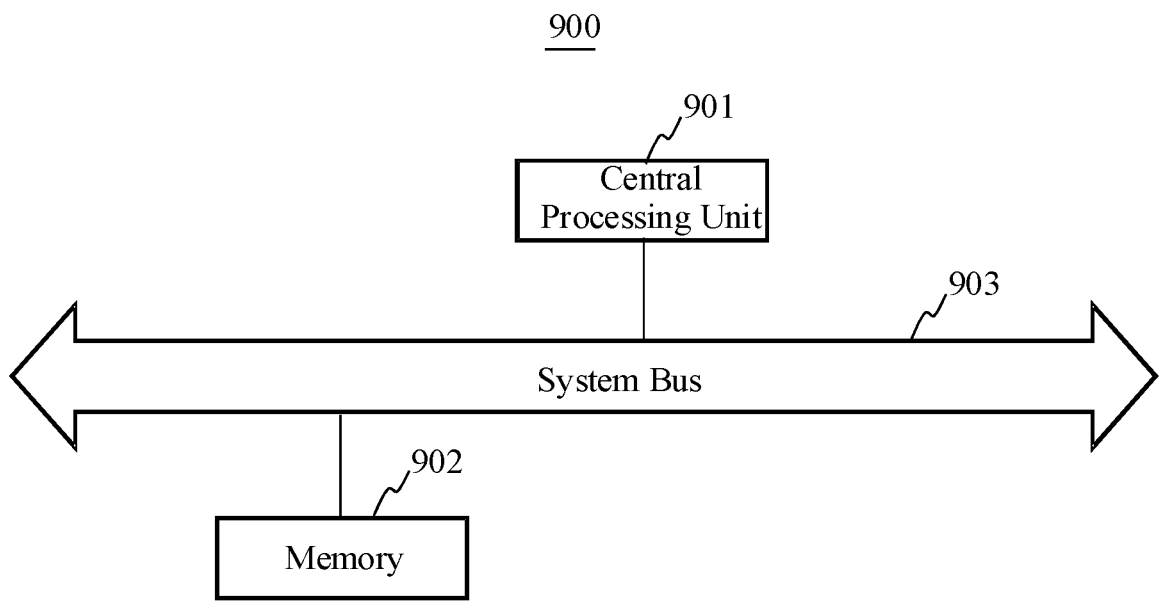
FIG. 9 is a schematic structural diagram of a server according to an embodiment of the present disclosure.

FIG. 9 is a schematic structural diagram of an automatic question answering apparatus 900 according to an embodiment of the present disclosure. The automatic question answering apparatus 900 may be a server. Exemplarily, as shown in FIG. 9, the apparatus 900 includes a central processing unit (CPU) 901, a memory 902, and a system bus 903 connecting the memory 902 and the central processing unit 901. The memory 902 may include computer-readable media (not shown) such as a hard disk or a CD-ROM drive.

Without loss of generality, the computer-readable medium may include a computer storage medium and a communication medium. The computer storage medium includes volatile and non-volatile, removable and non-removable media implemented in any method or technology for storage of information such as a computer-readable instruction, a data structure, a program module or other data. The computer storage medium includes a RAM, a ROM, an EPROM, an EEPROM, a flash memory or other solid-state storage media; a CD-ROM, DVD or other optical storage; and a tape cartridge, a magnetic tape, a disk storage or other magnetic storage devices. It will be known by a person skilled in the art that the computer storage medium is not limited to above.

The above memory 902 further includes at least one computer program. The at least one computer program is stored in the memory and configured to be run by the CPU to perform the method according to the embodiments of the present disclosure.

An embodiment of the present disclosure further provides an automatic question answering apparatus, including: a processor and a memory.

The memory is configured to store at least one computer program therein; and the processor is configured to run the at least one computer program stored in the memory to perform an automatic question answering method including:

acquiring numerical features of a sentence to be queried, the numerical features of the sentence being features of a plurality of numerical values determined based on the sentence;

querying a target sentence in a question database according to the numerical features of the sentence to be queried, the question database including a plurality of sentences and answers corresponding to the plurality of sentences, and the target sentence being a sentence whose numerical features are matched with the numerical features of the sentence to be queried; and determining a target answer according to an answer corresponding to the target sentence.

Optionally, the numerical features of the sentence to be queried belong to the same type; and prior to querying the target sentence in the question database according to the numerical features of the sentence to be queried, the automatic question answering method implemented by the processor when running the at least one computer program further includes:

determining a value range of numerical features of the plurality of sentences in the question database according to the type of the numerical features;

dividing the value range into a plurality of intervals; and acquiring a mapping relationship between the plurality of intervals and the plurality of sentences in the question database, each of the intervals in the mapping relationship corresponding to at least one sentence in the question database.

Optionally, querying the target sentence in the question database according to the numerical features of the sentence to be queried includes:

determining a target interval to which the numerical features of the sentence to be queried belongs in the plurality of intervals; and determining a sentence corresponding to the target interval as the target sentence according to the mapping relationship.

Optionally, the sentence to be queried includes at least two types of numerical features; and prior to querying the target sentence in the question database according to the numerical features of the sentence to be queried, the automatic question answering method performed by the processor when running the at least one computer program further includes:

determining value ranges of the at least two types of the numerical features of the plurality of sentences in the question database respectively according to the types of the at least two types of the numerical features;

dividing the value ranges of the at least two types of the numerical features into a plurality of intervals respectively; and acquiring a mapping relationship between the plurality of sentences in the question database and the plurality of intervals of the value range of each type of the numerical features, wherein interval in the mapping relationship corresponds to at least one sentence in the question database.

Optionally, querying the target sentence in the question database according to the numerical features of the sentence to be queried includes:

determining at least two target intervals of the at least two types of the numerical features of the sentence to be queried in the value ranges of the at least two types of the numerical features respectively;

acquiring at least two sentences corresponding to the at least two target intervals according to the mapping relationship; and determining a repeated sentence in the at least two sentences as the target sentence.

Optionally, determining the at least two target intervals of the at least two types of the numerical features of the sentence to be queried in the value ranges of the at least two types of the numerical features respectively includes:

determining at least two belonging intervals of the at least two types of the numerical features of the sentence to be queried in the value ranges of the at least two types of the numerical features respectively and intervals adjacent to the at least two belonging intervals as the target intervals.

Optionally, determining the at least two belonging intervals of the at least two types of the numerical features of the sentence to be queried in the value ranges of the at least two types of the numerical features respectively and the intervals adjacent to the at least two belonging intervals as the target intervals includes:

determining the at least two belonging intervals of the at least two types of the numerical features of the sentence to be queried in the value ranges of the at least two types of the numerical features respectively and two intervals adjacent to each of the belonging intervals as the target intervals.

Optionally, the numerical features include at least one of a mean, a variance, a covariance and a mathematical expectation.

Optionally, prior to acquiring the numerical features of the sentence to be queried, the automatic question answering method implemented by the processor executing the computer program stored on the memory further includes:

acquiring the sentence to be queried from a user terminal; and converting the sentence to be queried into a vector including a plurality of numerical values.

Optionally, acquiring the sentence to be queried at the user terminal includes:

acquiring a question voice from the user terminal; and performing voice recognition on the question voice to obtain the sentence to be queried.

Optionally, in response to determining the target answer according to the answer corresponding to the target sentence, the automatic question answering method performed by the processor when running the at least one computer program further includes:

providing the target answer for the user terminal.

For details of the automatic question answering method, reference may be made to the above embodiments, which are not repeated herein.

An embodiment of the present disclosure provides a storage medium storing at least one instruction therein. The at least one instruction, when executed by a processor of an automatic question answering apparatus, enables the processor to perform the automatic question answering method according to any of the above embodiments of the present disclosure.

Described above are only optional embodiments of the present disclosure, which are not intend to limit the present disclosure. However, any variation, equivalent substitution, modification and the like that fall within the spirit and principle of the present disclosure should be embraced by the protective scope of the present disclosure.

According to a first aspect of the present disclosure, an automatic question answering method is provided. The method includes:

acquiring a question sentence from a user terminal;

converting the question sentence into a vector including a plurality of numbers;

acquiring at least one type of numerical features of the plurality of numbers;

querying a target question in a question database according to the at least one type of the numerical features, wherein the question database includes a plurality of questions and answers corresponding to the plurality of questions, and the target question is a question whose numerical features in the question database and the numerical features of the user's question sentence have a similarity greater than a threshold; and determining a target answer according to an answer corresponding to the target question.

Optionally, when the numerical features belong to the same type, querying the target question in the question database according to the at least one type of the numerical features includes:

determining a value range of numerical features of the plurality of questions according to the type of the numerical features;

dividing the value range into a plurality of intervals;

setting a mapping relationship between the plurality of intervals and the plurality of questions, each interval corresponding to at least one of the plurality of questions;

determining a target interval to which the numerical features of the question sentence belongs in the plurality of intervals; and determining a question corresponding to the target interval as the question whose numerical features and the numerical features of the user's question sentence have the similarity greater than the threshold according to the mapping relationship.

Optionally, the at least one type of the numerical features includes a first numerical feature and a second numerical feature.

Querying the target question in the question database according to the at least one type of the numerical features includes:

determining a value range of the first numerical feature of the plurality of questions according to the type of the first numerical feature;

dividing the value range of the first numerical feature into a plurality of first intervals;

setting a mapping relationship between the plurality of first intervals and the plurality of questions, each first interval being at least corresponding to at least one of the plurality of questions;

determining an interval to which the first numerical feature of the question sentence belongs in the plurality of first intervals as a first target interval;

determining at least one question corresponding to the first target interval as a first target question according to the mapping relationship;

determining a value range of the second numerical feature of the plurality of questions according to the type of the second numerical feature;

dividing the value range of the second numerical feature into a plurality of second intervals;

setting a mapping relationship between the plurality of second intervals and the plurality of questions, each second interval being at least corresponding to at least one of the plurality of questions;

determining an interval to which the second numerical feature of the question sentence belongs in the plurality of second intervals as a second target interval;

determining at least one question corresponding to the second target interval as a second target question according to the mapping relationship; and determining a repeated question in the first target question and the second target question as the question whose numerical features and the numerical features of the user's question sentence have the similarity greater than the threshold.

Optionally, prior to determining the question whose first numerical feature falls in the first target interval as the first target question, the method further includes:

determining an interval to which the first numerical feature belongs in the plurality of first intervals and two intervals adjacent to the interval as first target intervals.

Prior to determining the question whose second numerical feature falls in the second target interval as the second target question, the method further includes:

determining an interval to which the second numerical feature belongs in the plurality of second intervals and two intervals adjacent to the interval as second target intervals.

Optionally, the numerical features include at least one of a mean, a variance, a covariance, and a mathematical expectation.

According to a second aspect of the present disclosure, an automatic question answering apparatus is provided. The apparatus includes:

an acquiring module, configured to acquire a question sentence from a user terminal;

a converting module, configured to convert the question sentence into a vector including a plurality of numbers, and acquire at least one type of numerical features of the plurality of numbers;

a querying module, configured to query a target question in a question database according to the at least one type of the numerical features, wherein the question database includes a plurality of questions and answers corresponding to the plurality of questions, and the target question is a question whose numerical features in the question database and the numerical features of the user's question sentence have a similarity greater than a threshold; and a feedback module, configured to determine a target answer according to an answer corresponding to the target question.

Optionally, when the numerical features belong to the same type, querying the target question in the question database according to the at least one type of the numerical features includes:

determining a value range of numerical features of the plurality of questions according to the type of the numerical features;

dividing the value range into a plurality of intervals;

setting a mapping relationship between the plurality of intervals and the plurality of questions, each interval corresponding to at least one of the plurality of questions;

determining a target interval to which the numerical features of the question sentence belongs in the plurality of intervals; and determining a question in the target interval as the question whose numerical features and the numerical features of the user's question sentence have the similarity greater than the threshold according to the mapping relationship.

Optionally, if the at least one type of the numerical features includes a first numerical feature and a second numerical feature, the query module includes a first query sub-module and a second query sub-module.

The first querying sub-module is configured to:

determine a value range of the first numerical feature of the plurality of questions according to the type of the first numerical feature;

divide the value range of the first numerical feature into a plurality of first intervals;

set a mapping relationship between the plurality of first intervals and the plurality of questions, each first interval corresponding to at least one of the plurality of questions;

determine an interval to which the first numerical feature of the question sentence belongs in the plurality of first intervals as a first target interval; and determine at least one question corresponding to the first target interval as a first target question according to the mapping relationship.

The second querying sub-module is configured to:

determine a value range of the second numerical feature of the plurality of questions according to the type of the second numerical feature;

divide the value range of the second numerical feature into a plurality of second intervals;

set a mapping relationship between the plurality of second intervals and the plurality of questions, each second interval corresponding to at least one of the plurality of questions;

determine an interval to which the second numerical feature of the question sentence belongs in the plurality of second intervals as a second target interval;

determine at least one question corresponding to the second target interval as a second target question according to the mapping relationship; and determine a repeated question in the first target question and the second target question as the question whose numerical features and the numerical features of the user's question sentence have the similarity greater than the threshold.

Optionally, prior to determining the question whose first numerical feature falls in the first target interval as the first target question, the first query sub-module is further configured to:

determine an interval to which the first numerical feature belongs in the plurality of first intervals and two intervals adjacent to the interval as first target intervals.

Prior to determining the question whose second numerical feature falls in the second target interval as the second target question, the second query sub-module is further configured to:

determine an interval to which the second numerical feature belongs in the plurality of second intervals and two intervals adjacent to the interval as second target intervals.

Optionally, the numerical features include at least one of a mean, a variance, a covariance and a mathematical expectation.

According to a third aspect of the present disclosure, a storage medium storing at least one instruction therein is provided. The at least one instruction, when executed by a processor of an automatic question answering apparatus, enables the processor to perform the automatic question answering method according to the first aspect of the present disclosure.

According to a fourth aspect of the present disclosure, a server is provided. The server includes the automatic question answering apparatus according to the second aspect.

According to a fifth aspect of the present disclosure, an electronic device is provided. The electronic device includes:

a processor; and a memory configured to store at least one instruction therein, wherein the at least one instruction, when executed by the processor, enables the processor to perform the automatic question answering method according to the first aspect of the present disclosure.

What is claimed is:

1. An automatic question answering method, comprising:
acquiring numerical features of a sentence to be queried, the numerical features of the sentence being features of a plurality of numerical values determined based on the sentence;

querying a target sentence in a question database according to the numerical features of the sentence to be queried, the question database comprising a plurality of sentences and answers corresponding to the plurality of sentences, and the target sentence being a sentence whose numerical features are matched with the numerical features of the sentence to be queried; and determining a target answer according to an answer corresponding to the target sentence, wherein the numerical features of the sentence to be queried belong to a same type;

prior to querying the target sentence in the question database according to the numerical features of the sentence to be queried, the method further comprises:

determining a value range of numerical features of the plurality of sentences in the question database according to the type of the numerical features;

dividing the value range into a plurality of intervals; and acquiring a mapping relationship between the plurality of intervals and the plurality of sentences in the question database, each of the intervals in the mapping relationship corresponding to at least one sentence in the question database; and querying the target sentence in the question database according to the numerical features of the sentence to be queried comprises:

determining a target interval to which the numerical features of the sentence to be queried belongs in the plurality of intervals; and determining a sentence corresponding to the target interval as the target sentence according to the mapping relationship.

2. The automatic question answering method according to claim 1, wherein the sentence to be queried comprises at least two types of numerical features;

prior to querying the target sentence in the question database according to the numerical features of the sentence to be queried, the method further comprises:

determining value ranges of the at least two types of the numerical features of the plurality of sentences in the question database respectively according to the types of the at least two types of the numerical features;

dividing the value ranges of the at least two types of the numerical features into a plurality of intervals respectively; and acquiring a mapping relationship between the plurality of sentences in the question database and the plurality of intervals of the value range of each type of the numerical features, each interval in the mapping relationship corresponding to at least one sentence in the question database; and querying the target sentence in the question database according to the numerical features of the sentence to be queried comprises:

determining at least two target intervals of the at least two types of the numerical features of the sentence to be queried in the value ranges of the at least two types of the numerical features respectively;

acquiring at least two sentences corresponding to the at least two target intervals according to the mapping relationship; and determining a repeated sentence in the at least two sentences as the target sentence.

3. The automatic question answering method according to claim 2, wherein determining the at least two target intervals of the at least two types of the numerical features of the sentence to be queried in the value ranges of the at least two types of the numerical features respectively comprises:

determining at least two belonging intervals of the at least two types of the numerical features of the sentence to be queried in the value ranges of the at least two types of the numerical features respectively and intervals adjacent to the at least two belonging intervals as the target intervals.

4. The automatic question answering method according to claim 3, wherein determining the at least two belonging intervals of the at least two types of the numerical features of the sentence to be queried in the value ranges of the at least two types of the numerical features respectively and the intervals adjacent to the at least two belonging intervals as the target intervals comprises:

determining the at least two belonging intervals of the at least two types of the numerical features of the sentence to be queried in the value ranges of the at least two types of the numerical features respectively and two intervals adjacent to each of the belonging intervals as the target intervals.

5. The automatic question answering method according to claim 1, wherein the numerical features comprise at least one of a mean, a variance, a covariance, and a mathematical expectation.

6. The automatic question answering method according to claim 1, wherein prior to acquiring the numerical features of the sentence to be queried, the method further comprises:

acquiring the sentence to be queried from a user terminal; and converting the sentence to be queried into a vector comprising a plurality of numerical values.

7. The automatic question answering method according to claim 6, wherein acquiring the sentence to be queried at the user terminal comprises:

acquiring a question voice from the user terminal; and performing voice recognition on the question voice to obtain the sentence to be queried.

8. The automatic question answering method according to claim 6, wherein in response to determining the target answer according to the answer corresponding to the target sentence, the method further comprises:

providing the target answer for the user terminal.

9. An automatic question answering apparatus, comprising: a processor and a memory; wherein the memory is configured to store at least one computer program; and the processor is configured to run the at least one computer program stored in the memory to perform an automatic question answering method comprising:

acquiring numerical features of a sentence to be queried, the numerical features of the sentence being features of a plurality of numerical values determined based on the sentence;

querying a target sentence in a question database according to the numerical features of the sentence to be queried, the question database comprising a plurality of sentences and answers corresponding to the plurality of sentences, and the target sentence being a sentence whose numerical features are matched with the numerical features of the sentence to be queried; and determining a target answer according to an answer corresponding to the target sentence, wherein the numerical features of the sentence to be queried belong to a same type;

prior to querying the target sentence in the question database according to the numerical features of the sentence to be queried, the automatic question answering method performed by the processor when running the computer program further comprises:

determining a value range of numerical features of the plurality of sentences in the question database according to the type of the numerical features;

dividing the value range into a plurality of intervals; and acquiring a mapping relationship between the plurality of intervals and the plurality of sentences in the question database, each of the intervals in the mapping relationship corresponding to at least one sentence in the question database; and querying the target sentence in the question database according to the numerical features of the sentence to be queried comprises:

determining a target interval to which the numerical features of the sentence to be queried belongs in the plurality of intervals; and determining a sentence corresponding to the target interval as the target sentence according to the mapping relationship.

10. The automatic question answering method according to claim 9, wherein the sentence to be queried comprises at least two types of numerical features;

prior to querying the target sentence in the question database according to the numerical features of the sentence to be queried, the automatic question answering method performed by the processor when running the computer program further comprises:

determining value ranges of the at least two types of the numerical features of the plurality of sentences in the question database respectively according to the types of the at least two types of the numerical features;

dividing the value ranges of the at least two types of the numerical features into a plurality of intervals respectively; and acquiring a mapping relationship between the plurality of sentences in the question database and the plurality of intervals of the value range of each type of the numerical features, each interval in the mapping relationship corresponding to at least one sentence in the question database; and querying the target sentence in the question database according to the numerical features of the sentence to be queried comprises:

determining at least two target intervals of the at least two types of the numerical features of the sentence to be queried in the value ranges of the at least two types of the numerical features respectively;

acquiring at least two sentences corresponding to the at least two target intervals according to the mapping relationship; and determining a repeated sentence in the at least two sentences as the target sentence.

11. The automatic question answering apparatus according to claim 10, wherein determining the at least two target intervals of the at least two types of the numerical features of the sentence to be queried in the value ranges of the at least two types of the numerical features respectively comprises:

determining at least two belonging intervals of the at least two types of the numerical features of the sentence to be queried in the value ranges of the at least two types of the numerical features respectively and intervals adjacent to the at least two belonging intervals as the target intervals.

12. The automatic question answering apparatus according to claim 11, wherein determining the at least two belonging intervals of the at least two types of the numerical features of the sentence to be queried in the value ranges of the at least two types of the numerical features respectively and the intervals adjacent to the at least two belonging intervals as the target intervals comprises:

determining the at least two belonging intervals of the at least two types of the numerical features of the sentence to be queried in the value ranges of the at least two types of the numerical features respectively and two intervals adjacent to each of the belonging intervals as the target intervals.

13. The automatic question answering apparatus of claim 9, wherein the numerical features comprise at least one of a mean, a variance, a covariance, and a mathematical expectation.

14. The automatic question answering apparatus of claim 9, wherein prior to acquiring the numerical features of the sentence to be queried, the automatic question answering method performed by the processor when running the at least one computer program further comprises:

acquiring the sentence to be queried from a user terminal; and converting the sentence to be queried into a vector comprising a plurality of numerical values.

15. The automatic question answering apparatus of claim 14, wherein acquiring the sentence to be queried at the user terminal comprises:

acquiring a question voice from the user terminal; and performing voice recognition on the question voice to obtain the sentence to be queried.

16. The automatic question answering apparatus of claim 9, wherein in response to determining the target answer according to the answer corresponding to the target sentence, the automatic question answering method performed by the processor when running the at least one computer program further comprises:

providing the target answer for the user terminal.

17. An non-transitory computer-readable storage medium storing at least one instruction therein; wherein the at least one instruction, when executed by a processor of an automatic question answering apparatus, enables the processor to perform an automatic question answering method comprising:

acquiring a sentence to be queried;

acquiring numerical features of a sentence to be queried, the numerical features of the sentence being features of a plurality of numerical values determined based on the sentence;

querying a target sentence in a question database according to the numerical features of the sentence to be queried, the question database comprising a plurality of sentences and answers corresponding to the plurality of sentences, and the target sentence being a sentence whose numerical features are matched with the numerical features of the sentence to be queried; and determining a target answer according to an answer corresponding to the target sentence, wherein the numerical features of the sentence to be queried belong to a same type;

prior to querying the target sentence in the question database according to the numerical features of the sentence to be queried, the method further comprises:

determining a value range of numerical features of the plurality of sentences in the question database according to the type of the numerical features;

dividing the value range into a plurality of intervals; and acquiring a mapping relationship between the plurality of intervals and the plurality of sentences in the question database, each of the intervals in the mapping relationship corresponding to at least one sentence in the question database; and querying the target sentence in the question database according to the numerical features of the sentence to be queried comprises:

determining a target interval to which the numerical features of the sentence to be queried belongs in the plurality of intervals; and determining a sentence corresponding to the target interval as the target sentence according to the mapping relationship.

18. A server, comprising the automatic question answering apparatus as defined in claim 9.

* * * * *